US012595024B2

(12) United States Patent
Hashimoto et al.

(10) Patent No.: US 12,595,024 B2
(45) Date of Patent: Apr. 7, 2026

(54) BICYCLE ELECTRIC COMPONENT SETTING SYSTEM

(71) Applicant: Shimano Inc., Osaka (JP)

(72) Inventors: Akinori Hashimoto, Osaka (JP); Takaya Masuda, Osaka (JP)

(73) Assignee: Shimano Inc., Osaka (JP)

( * ) Notice: Subject to any disclaimer, the term of this patent is extended or adjusted under 35 U.S.C. 154(b) by 38 days.

(21) Appl. No.: 17/719,174

(22) Filed: Apr. 12, 2022

(65) Prior Publication Data

US 2022/0234684 A1     Jul. 28, 2022

Related U.S. Application Data

(63) Continuation of application No. 14/639,741, filed on Mar. 5, 2015, now Pat. No. 11,801,913.

(51) Int. Cl.

| | |
|---|---|
| *B62J 45/00* | (2020.01) |
| *B62K 19/36* | (2006.01) |
| *B62K 23/02* | (2006.01) |
| *B62K 25/08* | (2006.01) |
| *B62K 25/28* | (2006.01) |
| *B62M 9/122* | (2010.01) |
| *B62M 9/132* | (2010.01) |

(Continued)

(52) U.S. Cl.
CPC ............. *B62M 25/08* (2013.01); *B62K 19/36* (2013.01); *B62K 23/02* (2013.01); *B62K 25/08* (2013.01); *B62K 25/28* (2013.01); *B62K 2025/045* (2013.01); *B62K 2025/047* (2013.01)

(58) Field of Classification Search
CPC ........ B62K 19/36; B62K 23/02; B62K 25/08; B62K 25/28; B62K 2025/045; B62K 2025/047; B62M 25/08; B25J 1/00; B25J 3/00; F16D 2048/0212; F16D 2025/081; G05B 2219/2231; G05B 2219/40407; G05B 2219/1215; G05B 2219/2237; G05B 2219/40405; G05B 2219/40406; G05B 2219/42185; G05B 2219/40138; G05B 2219/39122; G05B 2219/40399; G05B 2219/40401; G05B 2219/42186; G05B 2219/31179; G05B 2219/33342; G05B 2219/21074; G05B 2219/2232; G05B 2219/32052; G05B 2219/33345; G05B 2219/36454; G05B 2219/40182; G05B 2219/42184; G05B 13/19643; G05B 19/427; H03H 2210/046
USPC .......................................................... 701/2
See application file for complete search history.

(56) References Cited

U.S. PATENT DOCUMENTS

| | | |
|---|---|---|
| 5,971,116 A | 10/1999 | Franklin |
| 7,547,263 B2 | 6/2009 | Fukuda et al. |

(Continued)

FOREIGN PATENT DOCUMENTS

| | | |
|---|---|---|
| CN | 102591693 A | 7/2012 |
| CN | 202940846 U | 5/2013 |

(Continued)

*Primary Examiner* — Rachid Bendidi
*Assistant Examiner* — Hossam M Abd El Latif
(74) *Attorney, Agent, or Firm* — Spencer Fane, LLP

(57)     ABSTRACT

A master bicycle electric component includes a bicycle mounting part. The master bicycle electric component includes a master two-way wireless communication unit configured to wirelessly receive update information from an external terminal device that is not mounted to the bicycle.

13 Claims, 7 Drawing Sheets

(51) Int. Cl.
_B62M 25/08_ (2006.01)
_G06F 8/65_ (2018.01)
_B62K 25/04_ (2006.01)

(56) References Cited

U.S. PATENT DOCUMENTS

| | | | |
|---|---|---|---|
| 7,730,803 B2 | 6/2010 | Takamoto | |
| 7,760,078 B2 | 7/2010 | Miki et al. | |
| 7,902,967 B2 | 3/2011 | Takebayashi | |
| 8,091,910 B2 | 1/2012 | Hara et al. | |
| 8,121,757 B2 | 2/2012 | Song et al. | |
| 8,781,680 B2 | 7/2014 | Ichida et al. | |
| 2003/0080619 A1 | 5/2003 | Bray et al. | |
| 2004/0117072 A1* | 6/2004 | Takeda | H04L 67/306 |
| | | | 701/1 |
| 2005/0252330 A1 | 11/2005 | Denk | |
| 2006/0179153 A1 | 8/2006 | Lee et al. | |
| 2006/0221856 A1 | 10/2006 | Quiroz | |
| 2008/0267147 A1 | 10/2008 | Niranjan et al. | |
| 2009/0102628 A1 | 4/2009 | Takebayashi | |
| 2009/0170660 A1* | 7/2009 | Miglioranza | A63B 24/00 |
| | | | 482/1 |
| 2009/0192673 A1 | 7/2009 | Song et al. | |
| 2010/0010709 A1 | 1/2010 | Song | |
| 2010/0024590 A1 | 2/2010 | O'Neill et al. | |
| 2010/0228405 A1 | 9/2010 | Morgal et al. | |
| 2010/0327542 A1 | 12/2010 | Hara et al. | |
| 2012/0221203 A1 | 8/2012 | Ichida et al. | |
| 2012/0221204 A1 | 8/2012 | Ichida et al. | |
| 2013/0027052 A1* | 1/2013 | Matsumoto | B62J 50/21 |
| | | | 324/511 |
| 2013/0096762 A1 | 4/2013 | Houchin-Miller et al. | |
| 2014/0015659 A1* | 1/2014 | Tetsuka | B62M 9/122 |
| | | | 340/432 |
| 2014/0102237 A1* | 4/2014 | Jordan | B62M 9/132 |
| | | | 74/473.12 |
| 2014/0163730 A1* | 6/2014 | Mian | B25J 9/16 |
| | | | 700/248 |
| 2014/0209400 A1 | 7/2014 | Yao et al. | |
| 2014/0290412 A1* | 10/2014 | Emura | B62M 25/08 |
| | | | 74/473.12 |
| 2015/0100658 A1* | 4/2015 | Lieberman | G06F 3/1454 |
| | | | 709/208 |
| 2015/0197308 A1 | 7/2015 | Butora et al. | |
| 2015/0291253 A1* | 10/2015 | Schieffelin | B60L 15/20 |
| | | | 701/22 |
| 2015/0309784 A1* | 10/2015 | Molin | F01N 9/002 |
| | | | 701/1 |

FOREIGN PATENT DOCUMENTS

| | | |
|---|---|---|
| CN | 103963910 A | 8/2014 |
| CN | 204056179 U | 12/2014 |
| JP | 2004-38722 A | 2/2004 |
| TW | 201247469 A | 12/2012 |
| WO | 2004/087490 A2 | 10/2004 |

* cited by examiner

Master Unit Output

Signals Received by Slave Unit

BICYCLE ELECTRIC COMPONENT SETTING SYSTEM

CROSS-REFERENCE TO RELATED APPLICATIONS

This application claims priority under 35 U.S.C. § 120 to U.S. application Ser. No. 14/639,741, filed on Mar. 5, 2015. The entire disclosure of U.S. application Ser. No. 14/639, 741, filed on Mar. 5, 2015 is hereby incorporated herein by reference.

BACKGROUND

Field of the Invention

This invention generally relates to a bicycle electric component setting system. More specifically, the present invention relates to a bicycle electric component setting system.

Background Information

In recent years, some bicycles are provided with bicycle electric components or devices to make it easier for the rider to operate the bicycle. Occasionally, a manufacturer of these bicycle electric components will have updates for the software and/or the firmware. In some bicycle electric components are provided with an adapter in which an external terminal device is plugged into for directly installing the updates for each bicycle electric component. In this way, the user can individually update the software and/or the firmware of each bicycle electric components. In some bicycles, the electrical system is provided that has a plurality of bicycle electric components interconnected to a junction by wires. The junction has an adapter in which an external terminal device is plugged into for installing the updates to the bicycle electric components that are wired to the junction. More recently, bicycle electric components have been updated using wireless communication between an external terminal device and a plurality of bicycle electric components.

Summary

In accordance with a first aspect of the present disclosure, a master bicycle electric component is provided that includes a bicycle mounting part. The master bicycle electric component includes a master two-way wireless communication unit configured to wirelessly receive update information from an external terminal device that is not mounted to the bicycle.

With the master bicycle electric component of this first aspect, the user can electrically disconnect the external terminal device from slave bicycle electrical components once the master bicycle electric component receives the updated information from the external terminal device.

In accordance with a second aspect of the present invention, the master bicycle electric component according to the first aspect is configured so that the master two-way wireless communication unit is configured to wirelessly transmit the update information to a slave bicycle electric component having a bicycle mounting part.

In accordance with a third aspect of the present invention, the master bicycle electric component according to any of the first and second aspects further comprises a master storage device that stores the update information.

In accordance with a fourth aspect of the present invention, the master bicycle electric component according to any of the first to third aspects is configured so that the update information includes software update, firmware update, and component settings.

In accordance with a fifth aspect of the present invention, the master bicycle electric component according to any of the second to fourth aspects is configured so that the slave bicycle electric component includes at least one of a bicycle electric transmission device, a bicycle electric suspension device, an electric adjustable seatpost, a bicycle electric control device to control the bicycle electric transmission device, and a bicycle electric suspension control device.

In accordance with a sixth aspect of the present invention, the master bicycle electric component according to the first aspect further comprises an actuator that is controlled by the master bicycle electric component in response to receiving the update information.

In accordance with a seventh aspect of the present invention, the master bicycle electric component according to the sixth aspect is configured so that the master bicycle electric component is a bicycle electric transmission device.

In accordance with an eighth aspect of the present invention, the master bicycle electric component according to the seventh aspect is configured so that the bicycle electric transmission device includes an electrically operated front derailleur and an electrically operated rear derailleur, and the master bicycle electric component is one of the electrically operated front derailleur and the electrically operated rear derailleur.

In accordance with a ninth aspect of the present invention, a bicycle electric component setting system is provided that comprises the master bicycle electric component in accordance with any of the first to fifth aspects, and the external terminal device includes a two-way wireless communication unit configured to wirelessly communicate the update information.

In accordance with a tenth aspect of the present invention, the bicycle electric component setting system according to the ninth aspect is configured so that the external terminal device includes a terminal storage device that stores the update information.

In accordance with an eleventh aspect of the present invention, the bicycle electric component setting system according to the tenth aspect is configured so that the external terminal device includes a terminal controller configured to execute a program that allows a user to program settings of a slave bicycle electric component. The slave bicycle electric component includes at least one of a bicycle electric transmission device, a bicycle electric suspension device, an electric adjustable seatpost, a bicycle electric control device to control the bicycle electric transmission device, and a bicycle electric suspension control device.

Also other objects, features, aspects and advantages of the disclosed bicycle electric component setting system will become apparent to those skilled in the art from the following detailed description, which, taken in conjunction with the annexed drawings, discloses preferred embodiments of the bicycle electric component setting system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
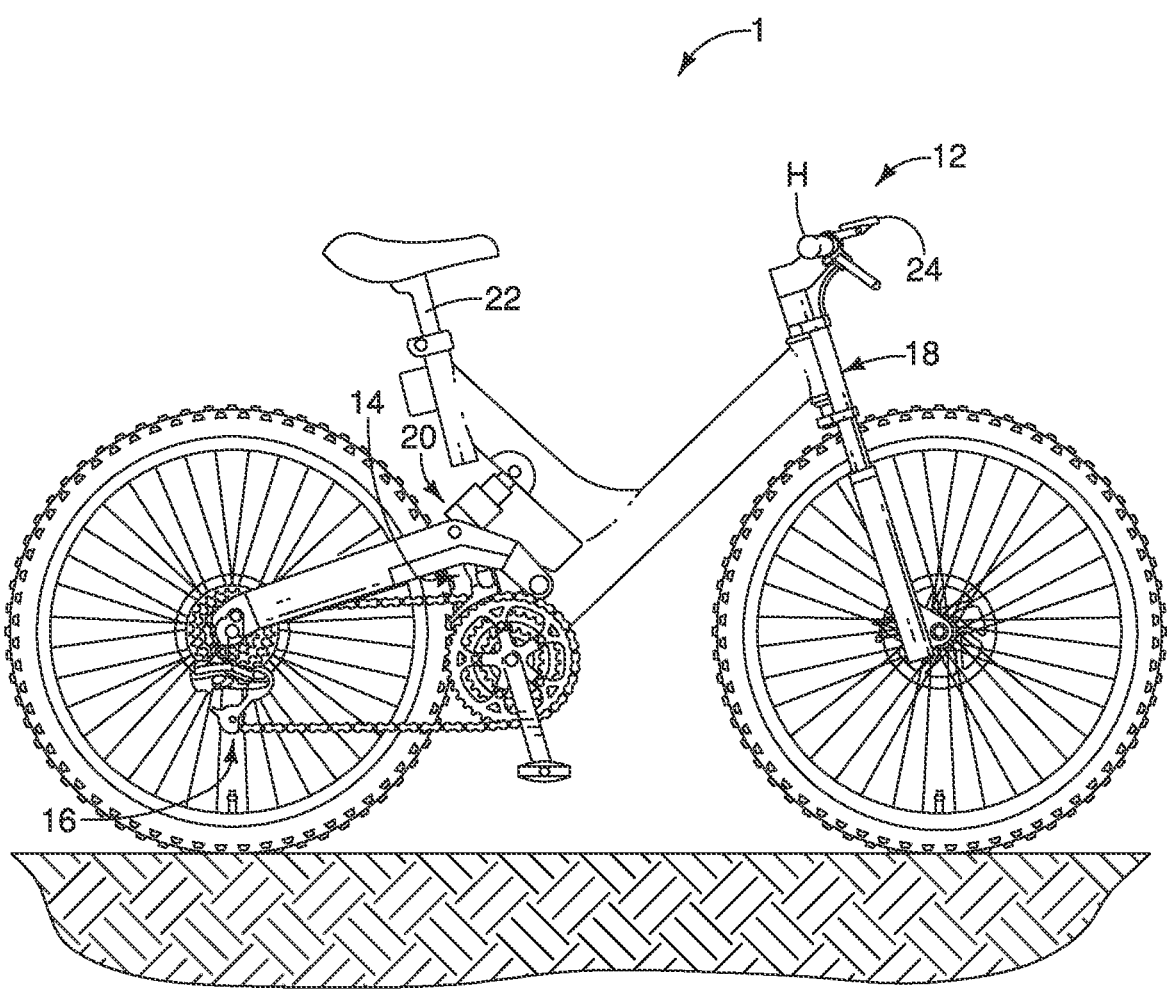
FIG. 1 is a side elevational view of a bicycle that is equipped with a bicycle electric component setting system in accordance with one illustrated embodiment.

Referring initially to FIG. 1, a bicycle 1 is illustrated that is equipped with a bicycle electric component setting system 12 in accordance with a first embodiment. In the illustrated embodiment, the bicycle electric component setting system 12 is a wireless system in which one of a plurality of bicycle electric components is a master bicycle electric component while the rest of the bicycle electric components are slave bicycle electric components that receive update information from the master bicycle electric component. Alternatively, as explained below, instead of having one of the bicycle electric components being designated as the master bicycle electric component, the bicycle 1 can be provided with a separate master unit that sole function is to distribute update information to the bicycle electric components, which are slave bicycle electric components. The phrase "master unit" as used herein refers to a device or bicycle electric component that is configured to receive for a plurality of bicycle electric components and distribute the update information to the bicycle electric components. Thus, the master unit can include a master bicycle electric component or a non-bicycle electric component that is configured to receive the update information and to wirelessly transmit the update information to at least one of the slave bicycle electric components.

As seen in FIG. 1, in the illustrated embodiment, the bicycle electric component setting system 12 comprises, among other things, the following bicycle electric component: an electrically operated front derailleur 14, an electrically operated rear derailleur 16, an electrically adjustable front suspension 18, an electrically adjustable rear suspension 20 and an electrically adjustable seatpost 22. The front derailleur 14 and the rear derailleur 16 are examples of bicycle electric transmission devices. The front derailleur 14 is mounted to the frame of the bicycle 1 in a conventional manner such as a clamp or a support that is mounted to the bottom bracket of the bicycle 1. The rear derailleur 16 is mounted to a rear hanger of the bicycle 1 or on the rear hub axle of the bicycle 1 in a conventional manner. The front suspension 18, the rear suspension 20, and the seatpost 22 are examples of non-shifting bicycle electric devices. The front suspension 18 forms a front fork of the bicycle 1 and mounted to the frame of the bicycle 1 in a conventional manner. The seatpost 22 is mounted to a seat tube of the bicycle frame of the bicycle 1 in a conventional manner. The rear suspension 20 is mounted between the frame of the bicycle 1 and a sub frame of the bicycle 1 in a conventional manner. The seatpost 22 is mounted to a seat tube of the bicycle frame of the bicycle 1 in a conventional manner. The bicycle electric component setting system 12 comprises a master unit 24 having a sole function of distributing update information to the bicycle electric components, which are slave bicycle electric components.

Figure 2:
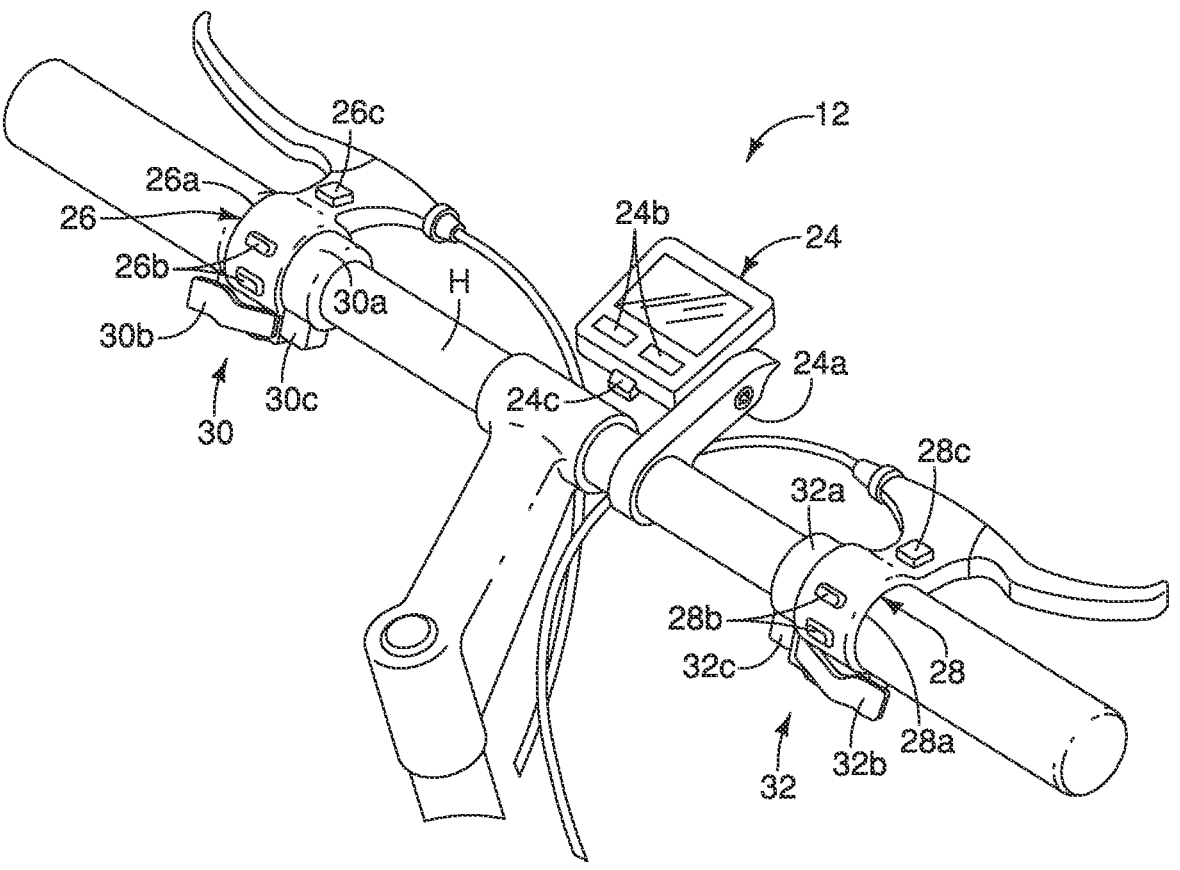
FIG. 2 is a perspective view of the handlebar area of the bicycle illustrated in FIG. 1, with a controller and switches mounted to a straight type handlebar.

As seen in FIG. 2, in the illustrated embodiment, the bicycle electric component setting system 12 further comprises the following bicycle electric component: a first bicycle electric control device 26, a second bicycle electric control device 28, a first bicycle electric suspension control device 30 and a second bicycle electric suspension control device 32. Basically, the first bicycle electric control device 26 has a first base member 34 and a first user operating member 36, while the second bicycle electric control device 28 has a second base member 38 and a second user operating member 40.

As seen in FIG. 2, the master unit 24 includes a bicycle mounting bracket 24a, a pair of user input members 24b (push buttons) and a two-way wireless communication unit 24c. The master unit 24 is configured to be mounted to the handlebar H of the bicycle 1 by the mounting bracket 24a in a conventional manner. Here, the mounting bracket 24a has a non-hinged clamp that clamps to the handlebar H. Of course, it will be apparent to those skilled in the bicycle field from this disclosure that the mounting bracket 24a can be mounted to the handlebar H or another portion of the bicycle 1 with a different type of mounting structure (e.g., a hinged clamp, a strap, etc.).

The input members 24b are used to operate, set, program, etc. a controller (not shown). The controller of the master unit 24 is basically a microcomputer that includes a central processing unit (CPU) and other conventional components such as an input interface circuit, an output interface circuit, firmware and storage devices such as ROM (Read Only Memory) and RAM (Random Access Memory). The storage device stores various user settings that were inputted via the user input members 24b and/or an external terminal device such as a personal computer PC, a laptop, a smart phone, or portable touch panel device (tablet device). The controller of the master unit 24 can be provided with various control programs that control the bicycle electric components 14, 16, 18, 20 and 22 and/or the other bicycle electric components of the bicycle 1.

The two-way wireless communication unit 24c is controlled by the controller of the master unit 24. The two-way wireless communication unit 24c communicates using a wireless communication standard such as, for example, IEEE 802.15 or IEEE 802.15.4 with CSMA/CA. The phrase "wirelessly connected" as used herein refers to a connection between two devices where a communication is accomplished without wires. The phrase "wired connected" as used herein refers to a connection between two devices where a communication is accomplished by at least one current carrying wire. The phrase "electromagnetically connected" as used herein refers to a connection between two devices where a communication is accomplished by either without wires (wireless) or by at least one current carrying wire.

As seen in FIG. 2, the first bicycle electric control device 26 includes a bicycle mounting bracket 26a, a pair of user input members 26b (push buttons) and a two-way wireless communication unit 26c. Here, a brake lever is mounted to the bicycle mounting bracket 26a. However, the first bicycle electric control device 26 can be a standalone device, or combined with some other component of the bicycle 1 as needed and/or desired.

In the illustrated embodiment, the first bicycle electric control device 26 is configured to control the front derailleur 14 based on which of the user input members 26b is operated and a length of time of operation on the user input member 26b. As the input members 26b are operated from a rest position to an operated position, at least one switch (not shown) is operated by movement of the input members 26b. The at least one switch outputs one or more operation signals to a controller (not shown). The controller then controls the two-way wireless communication unit 26c to wirelessly transmit wireless control signals to the front derailleur 14. Operation of one of the user input member 26b causes an upshift signal to be generated by the controller and the two-way wireless communication unit 26c to wirelessly transmit the wireless control signals as upshift signals. Operation of the other one of the user input member 26b causes a downshift signal to be generated by the controller and the two-way wireless communication unit 26c to wirelessly transmit the wireless control signals as downshift signals. Since wireless control devices are known in the bicycle field, the first bicycle electric control device 26 will only be discussed as necessary to understand the present invention.

The first bicycle electric control device 26 is configured to be mounted to the handlebar H of the bicycle 1 by the mounting bracket 26a in a conventional manner. Here, the mounting bracket 26a has a non-hinged clamp that clamps to the handlebar H. Of course, it will be apparent to those skilled in the bicycle field from this disclosure that the mounting bracket 26a can be mounted to the handlebar H or another portion of the bicycle 1 with a different type of mounting structure (e.g., a hinged clamp, a strap, etc.).

The controller of the first bicycle electric control device 26 is basically a microcomputer that includes a central processing unit (CPU) and other conventional components such as an input interface circuit, an output interface circuit, firmware and storage devices such as ROM (Read Only Memory) and RAM (Random Access Memory). The storage device stores various user settings that were inputted via the user input members 26b and/or an external terminal device such as a personal computer PC, a laptop, a smart phone, or portable touch panel device (tablet device). The controller of the first bicycle electric control device 26 can be provided with various control programs that control the front derailleur 14.

The two-way wireless communication unit 26c is controlled by the controller of the first bicycle electric control device 26. The two-way wireless communication unit 26c communicates using a wireless communication standard such as, for example, IEEE 802.15 or IEEE 802.15.4 with CSMA/CA. The first bicycle electric control device 26 is designed to wirelessly communicate with the front derailleur 14.

As seen in FIG. 2, the second bicycle electric control device 28 includes a bicycle mounting bracket 28a, a pair of user input members 28b (push buttons) and a two-way wireless communication unit 28c. Here, a brake lever is mounted to the bicycle mounting bracket 28a. However, the second bicycle electric control device 28 can be a standalone device, or combined with some other component of the bicycle 1 as needed and/or desired.

In the illustrated embodiment, the second bicycle electric control device 28 is configured to control the rear derailleur 16 based on which of the user input members 28b is operated and a length of time of operation on the user input member 28b. As the input members 28b are operated from a rest position to an operated position, at least one switch (not shown) is operated by movement of the input members 28b. The at least one switch outputs one or more operation signals to a controller (not shown). The controller then controls the two-way wireless communication unit 28c to wirelessly transmit wireless control signals to the rear derailleur 16. Operation of one of the user input member 28b causes an upshift signal to be generated by the controller and the two-way wireless communication unit 28c to wirelessly transmit the wireless control signals as upshift signals. Operation of the other one of the user input member 28b causes a downshift signal to be generated by the controller and the two-way wireless communication unit 28c to wirelessly transmit the wireless control signals as downshift signals. Since wireless control devices are known in the bicycle field, the second bicycle electric control device 28 will only be discussed as necessary to understand the present invention.

The second bicycle electric control device 28 is configured to be mounted to the handlebar H of the bicycle 1 by the mounting bracket 28a in a conventional manner. Here, the mounting bracket 28a has a non-hinged clamp that clamps to the handlebar H. Of course, it will be apparent to those skilled in the bicycle field from this disclosure that the mounting bracket 28a can be mounted to the handlebar H or another portion of the bicycle 1 with a different type of mounting structure (e.g., a hinged clamp, a strap, etc.).

The controller of the second bicycle electric control device 28 is basically a microcomputer that includes a central processing unit (CPU) and other conventional components such as an input interface circuit, an output interface circuit, firmware and storage devices such as ROM (Read Only Memory) and RAM (Random Access Memory). The storage device stores various user settings that were inputted via the user input members 28b and/or an external terminal device such as a personal computer PC, a laptop, a smart phone, or portable touch panel device (tablet device). The controller of the second bicycle electric control device 28 can be provided with various control programs that control the rear derailleur 16.

The two-way wireless communication unit 28c is controlled by the controller of the second bicycle electric control device 28. The two-way wireless communication unit 28c communicates using a wireless communication standard such as, for example, IEEE 802.15 or IEEE 802.15.4 with CSMA/CA. The first bicycle electric control device 26 is designed to wirelessly communicate with the rear derailleur 16.

As seen in FIG. 2, the first bicycle electric suspension control device 30 includes a bicycle mounting bracket 30a, a user input members 30b (pivoting lever) and a two-way wireless communication unit 30c. In the illustrated embodiment, the first bicycle electric suspension control device 30 is configured to control settings of the front suspension 18 based on the operation on the user input member 30b. As the input member 30b is operated from a rest position to an operated position, at least one switch (not shown) is operated by movement of the input member 30b. The at least one switch outputs one or more operation signals to a controller (not shown). The controller then controls the two-way wireless communication unit 30c to wirelessly transmit wireless control signals to the front suspension 18. The front suspension 18 is configured such that it can assume one of two operating states: a free state and a locked state. In the free state, the front suspension 18 can expand and contract. In the locked state, the front suspension 18 is prohibited from expanding and contracting, but still may expand and contract in a limited situation, e.g., by a separate blow-off structure. The operating state of the front suspension 18 can also be called a "setting state" of the front suspension 18.

Operation of the user input member 30b causes a state setting signal to be generated by the controller and the two-way wireless communication unit 30c to wirelessly transmit the wireless control signals as state setting signals. If there are only two operating states, then operation of the user input member 30b alternate switch the state. However, the first bicycle electric suspension control device 30 is not limited to this configuration. For example, although the front suspension 18 has been explained as having two operating states of the suspension, namely a locked state and a free state, it is acceptable for the operating states of the suspension to include such aspects as a suspension height, a suspension stiffness, a suspension compression damping force, a suspension rebound damping force, and an damping force occurring when a rider pedals. When the front suspension 18 has more than two operating states, the controller of the first bicycle electric suspension control device 30 can be programmed to change the operating states of the front suspension 18 based on the number of times the user input member 30b operated and a length of time of operation on the user input member 30b. Since wireless control devices are known in the bicycle field, the first bicycle electric suspension control device 30 will only be discussed as necessary to understand the present invention.

The first bicycle electric suspension control device 30 is configured to be mounted to the handlebar H of the bicycle 1 by the mounting bracket 30a in a conventional manner. Here, the mounting bracket 30a has a non-hinged clamp that clamps to the handlebar H. Of course, it will be apparent to those skilled in the bicycle field from this disclosure that the mounting bracket 30a can be mounted to the handlebar H or another portion of the bicycle 1 with a different type of mounting structure (e.g., a hinged clamp, a strap, etc.).

The controller of the first bicycle electric suspension control device 30 is basically a microcomputer that includes a central processing unit (CPU) and other conventional components such as an input interface circuit, an output interface circuit, firmware and storage devices such as ROM (Read Only Memory) and RAM (Random Access Memory). The storage device stores various user settings that were inputted via the user input members 30b and/or an external terminal device such as a personal computer PC, a laptop, a smart phone, or portable touch panel device (tablet device). The controller of the first bicycle electric suspension control device 30 can be provided with various control programs that control the front suspension 18.

The two-way wireless communication unit 30c is controlled by the controller of the first bicycle electric suspension control device 30. The two-way wireless communication unit 30c communicates using a wireless communication standard such as, for example, IEEE 802.15 or IEEE 802.15.4 with CSMA/CA. The first bicycle electric suspension control device 30 is designed to wirelessly communicate with the front suspension 18.

As seen in FIG. 2, the second bicycle electric suspension control device 32 includes a bicycle mounting bracket 32a, a user input members 32b (pivoting lever) and a two-way wireless communication unit 32c. In the illustrated embodiment, the second bicycle electric suspension control device 32 is configured to control settings of the rear suspension 20 based on the operation on the user input member 32b. As the input member 32b is operated from a rest position to an operated position, at least one switch (not shown) is operated by movement of the input member 32b. The at least one switch outputs one or more operation signals to a controller (not shown). The controller then controls the two-way wireless communication unit 32c to wirelessly transmit wireless control signals to the rear suspension 20. The rear suspension 20 is configured such that it can assume one of two operating states: a free state and a locked state. In the free state, the rear suspension 20 can expand and contract. In the locked state, the rear suspension 20 is prohibited from expanding and contracting, but still may expand and contract in a limited situation, e.g., by a separate blow-off structure. The operating state of the rear suspension 20 can also be called a "setting state" of the rear suspension 20.

Operation of the user input member 32b causes a state setting signal to be generated by the controller and the two-way wireless communication unit 32c to wirelessly transmit the wireless control signals as state setting signals. If there are only two operating states, then operation of the user input member 32b alternate switch the state. However, the second bicycle electric suspension control device 32 is not limited to this configuration. For example, although the rear suspension 20 has been explained as having two operating states of the suspension, namely a locked state and a free state, it is acceptable for the operating states of the suspension to include such aspects as a suspension height, a suspension stiffness, a suspension compression damping force, a suspension rebound damping force, and an damping force occurring when a rider pedals. When the rear suspension 20 has more than two operating states, the controller of the second bicycle electric suspension control device 32 can be programmed to change the operating states of the rear suspension 20 based on the number of times the user input member 32b operated and a length of time of operation on the user input member 32b. Since wireless control devices are known in the bicycle field, the second bicycle electric suspension control device 32 will only be discussed as necessary to understand the present invention.

The second bicycle electric suspension control device 32 is configured to be mounted to the handlebar H of the bicycle 1 by the mounting bracket 32a in a conventional manner. Here, the mounting bracket 32a has a non-hinged clamp that clamps to the handlebar H. Of course, it will be apparent to those skilled in the bicycle field from this disclosure that the mounting bracket 32a can be mounted to the handlebar H or another portion of the bicycle 1 with a different type of mounting structure (e.g., a hinged clamp, a strap, etc.).

The controller of the second bicycle electric suspension control device 32 is basically a microcomputer that includes a central processing unit (CPU) and other conventional components such as an input interface circuit, an output interface circuit, firmware and storage devices such as ROM (Read Only Memory) and RAM (Random Access Memory). The storage device stores various user settings that were inputted via the user input members 32b and/or an external terminal device such as a personal computer PC, a laptop, a smart phone, or portable touch panel device (tablet device). The controller of the second bicycle electric suspension control device 32 can be provided with various control programs that control the rear suspension 20.

The two-way wireless communication unit 32c is controlled by the controller of the second bicycle electric suspension control device 32. The two-way wireless communication unit 32c communicates using a wireless communication standard such as, for example, IEEE 802.15 or IEEE 802.15.4 with CSMA/CA. The second bicycle electric suspension control device 32 is designed to wirelessly communicate with the rear suspension 20.

Here, in the illustrated embodiment, the seatpost 22 is not provided with its own separate control device. Rather, one of the controllers of the control devices 26, 28, 30 and 32 is programmed to also control the height adjustment of the seatpost 22. For example, the first bicycle electric control device 26 can be used to operate the front derailleur 16 and adjust the height of the seatpost 22. In this case, for example, the controller of the control devices 26 can be programmed such that simultaneous operation of both of the user input members 26b switch modes from a derailleur operating mode to a seatpost adjustment mode. In the seatpost adjustment mode, one of the user input members 26b is used to raise the seatpost 22, while the other one of the user input members 26b is used to lower the seatpost 22. Preferably, the controller of the control devices 26 is programmed such that after a predetermined period of time elapses from the last operation of one of the user input members 26b, the controller switches from the seatpost adjustment mode to the derailleur operating mode.

Figure 3:
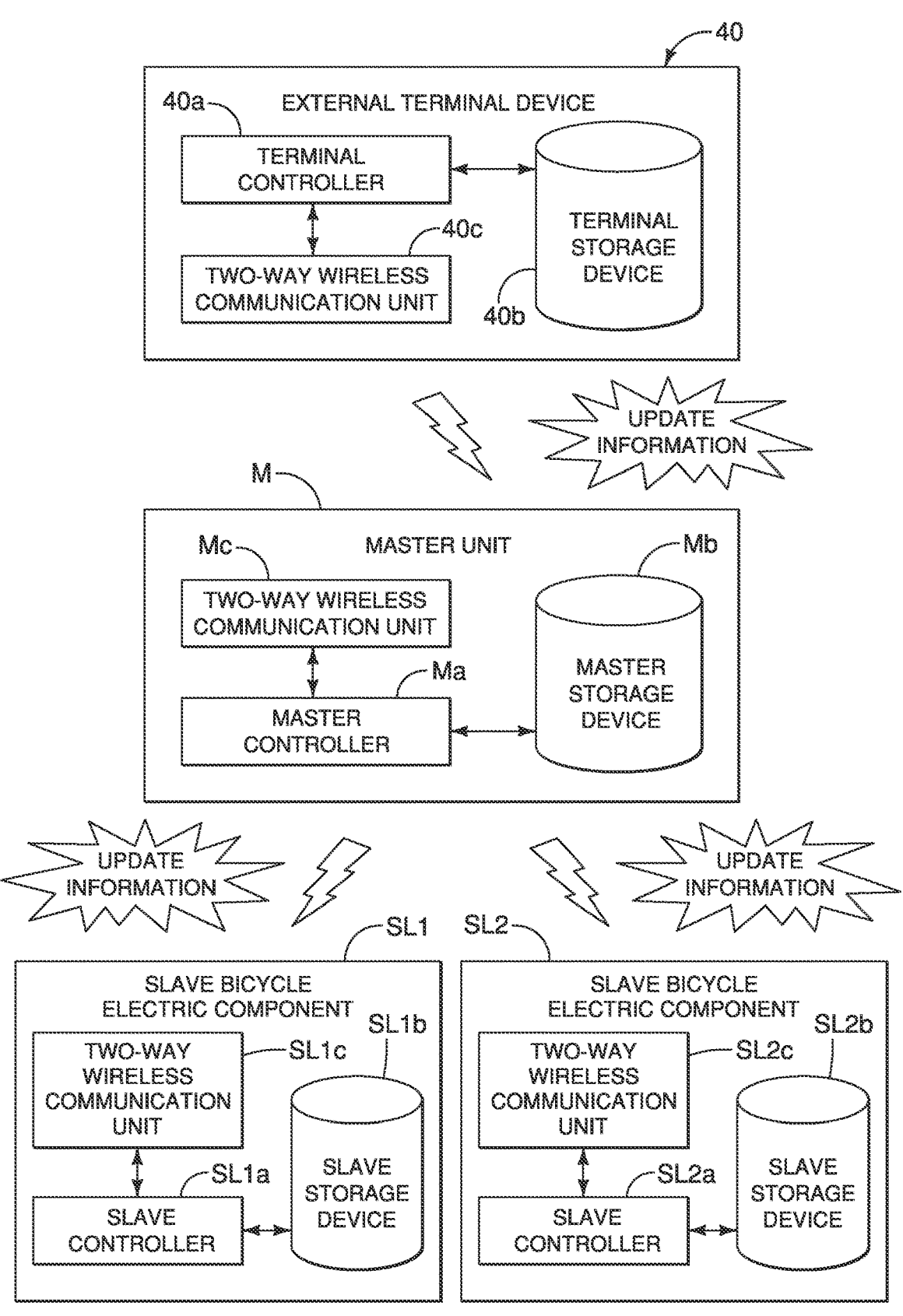
FIG. 3 is a schematic block diagram showing an exemplary configuration of the bicycle electric component setting system in which an external terminal device wirelessly transmits update information to a master unit which in turn wirelessly transmits update information to two slave bicycle electric components.

Referring to FIG. 3, an overview of the bicycle electric component setting system 12 will now be generically discussed. In this simplified embodiment, the bicycle electric component setting system 12 comprises a master unit M and a plurality (two) of slave bicycle electric components SL1 and SL2. While only two slave bicycle electric components are shown, the number of the slave bicycle electric components which communicate with the master unit M can be more than two slave bicycle electric components as needed and/or desired. The master unit M basically comprises a master controller Ma, a master storage device Mb and a master two-way wireless communication unit Mc. The master unit M can be anyone of the bicycle electric components 14, 16, 18, 20, 22, 26, 28, 30 and 32, or can be the master unit 24. The slave bicycle electric component SL1 basically comprises a slave controller SL1a, a slave storage device SL1b and a slave two-way wireless communication unit SL1c. The slave bicycle electric component SL2 basically includes a slave controller SL2a, a slave storage device SL1b and a slave two-way wireless communication unit SL2c. The slave bicycle electric components SL1 and SL2 can be any of the bicycle electric components 14, 16, 18, 20, 22, 26, 28, 30 and 32 that is not the master unit M. Since the master unit M can be anyone of the bicycle electric components 14, 16, 18, 20, 22, 26, 28, 30 and 32, or can be the master unit 24, the master unit M is configured to be mounted to the bicycle 1 using, for example, a mounting bracket such as one of the mounting brackets 26a, 28a, 30a and 32a. Since the slave bicycle electric components SL1 and SL2 can be any of the bicycle electric components 14, 16, 18, 20, 22, 26, 28, 30 and 32 that is not the master unit M, the slave bicycle electric components SL1 and SL2 are configured to be mounted to the bicycle 1 using, for example, a mounting bracket such as one of the mounting brackets 26a, 28a, 30a and 32a.

Each of the controllers Ma, SL1a and SL2a is basically a microcomputer that includes a central processing unit (CPU) and other conventional components such as an input interface circuit, an output interface circuit and various firmware. Each of the storage devices Mb, SL1b and SL2b is configured to store update information, programs, settings, parameters, etc. that are used for their operation. Each of the two-way wireless communication units Mc, SL1c and SL2c communicates using a wireless communication standard such as, for example, IEEE 802.15 or IEEE 802.15.4 with CSMA/CA protocol to communicate with each other.

An external terminal device 40 is used as an updating and/or setting device for providing software updates and/or firmware updates as well as desired component settings to the master unit M, which in turn wirelessly transmits the software updates, firmware updates and/or component settings. The external terminal device 40 can be anyone of a personal computer PC, a laptop, a smart phone, or portable touch panel device (tablet device). The software and firmware updates and the component settings are each types of update information that is outputted to the master unit M. While the external terminal device 40 is illustrated as wirelessly communicating with the master unit M, it will be apparent from this disclosure that the external terminal device 40 can be wired connected to the master unit M for communicating the software updates, firmware updates and/or component settings. For example, each of the external terminal device 40 and the master unit M can be provided with a USB (universal serial bus) port and connected with a USB cable. However, wirelessly communication between the external terminal device 40 and the master unit M is preferred, since it avoids troublesome cable routing.

In this simplified embodiment, as shown in FIG. 3, the external terminal device 40 basically includes a terminal controller 40a, a terminal storage device 40b and a two-way wireless communication unit 40c. The external terminal device 40 further includes other conventional components such as an input interface circuit and an output interface circuit. The terminal storage device 40b is typically a hard drive that stores the update information to be sent to the slave bicycle electric components SL1 and SL2. The terminal controller 40a also typically includes other storage devices such as ROM (Read Only Memory) and RAM (Random Access Memory). The terminal controller 40a is programmed to control the two-way wireless communication unit 40c to wirelessly communicate the update information based on the user preferences. Preferably, the terminal controller 40a executes a program that allows the user to program various settings of the bicycle electric components 14, 16, 18, 20, 22, 26, 28, 30 and 32.

The two-way wireless communication unit 40c is configured to wireless communicate with the two-way wireless communication unit Mc but not with the slave two-way wireless communication unit SL1c and the two-way wireless communication unit SL2c. On the other hand, the two-way wireless communication unit Mc is configured to wirelessly communicate with both the slave two-way wireless communication units SL1c and SL2c. In this way, the master unit M is configured to wirelessly receive the update information from the external terminal device 40. Alternatively, the master unit M is configured to receive the update information from the external terminal device 40 using a wire. The slave bicycle electric components SL1 and SL2 are configured to wirelessly receive the update information from the master unit M to change a setting of at least one of the slave bicycle electric components SL1 and SL2. Alternatively, the slave bicycle electric components SL1 and SL2 are configured to receive update information from the external terminal device 40 using wires. In other words, although not preferred, the slave bicycle electric components SL1 and SL2 can be electrically wired to the master unit M.

The master two-way wireless communication unit Mc is controlled by the controller Mc of the master unit M. The master two-way wireless communication unit Mc communicates with the slave two-way wireless communication units SL1c and SL2c using a wireless communication standard such as, for example, IEEE 802.15 or IEEE 802.15.4 with CSMA/CA protocol. Using CSMA/CA protocol, the controller Mc of the master unit M is configured to wirelessly transmit the update information to at least one of the slave bicycle electric components SL1 and SL2 after the external terminal device 40 is electrically and wirelessly disconnected from the master unit M. In other word, in one preferred configuration, the controller Mc is programmed to wait until all of the update information is received for a selected one of the slave bicycle electric components SL1 and SL2 from the external terminal device 40 before the controller Mc starts to update that by the selected one the slave bicycle electric components SL1 and SL2. The controller Mc can be programmed to start transmitting the update information to one of the slave bicycle electric components SL1 and SL2 once the update information is completely received, while still receiving the update information from the other one of the slave bicycle electric components SL1 and SL2. Alternatively, the controller Mc can be programmed to wait to transmit any of the update information until all of the update information is completely received for both of the slave bicycle electric components SL1 and SL2.

Using CSMA/CA protocol, the master unit M is configured to wirelessly transmit the update information to one of the slave bicycle electric components SL1 and SL2 while the one of the slave bicycle electric components SL1 and SL2 is free of wireless communication with at least one of the master unit M and the other of the slave bicycle electric components SL1 and SL2. In other word, in one preferred configuration, before starting to wirelessly transmit the update information to a selected one of the slave bicycle electric components SL1 and SL2, the controller Mc is programmed to first determine if the selected one of the slave bicycle electric components SL1 and SL2 is free of wireless communication with the master unit M and/or the other of the slave bicycle electric components SL1 and SL2. Then, if it is determined that the selected one of the slave bicycle electric components SL1 and SL2 is free of wireless communication with the master unit M and/or the other of the slave bicycle electric components SL1 and SL2, the master two-way wireless communication unit Mc begins communicating with the selected one of the slave two-way wireless communication units SL1c and SL2c.

Using CSMA/CA protocol, the master unit M is configured to wirelessly transmit the update information to one of the slave bicycle electric components SL1 and SL2 while the master unit M is free of wireless communication with the other of the slave bicycle electric components SL1 and SL2. In other word, in one preferred configuration, before starting to wirelessly transmit the update information to a selected one of the slave bicycle electric components SL1 and SL2, the controller Mc is programmed to first determine if the master unit M is free of wireless communication with the non-selected one of the slave bicycle electric components SL1 and SL2. Then, if it is determined that the master unit M is free of wireless communication with the non-selected one of the slave bicycle electric components SL1 and SL2, the master two-way wireless communication unit Mc begins communicating with the selected one of the slave two-way wireless communication units SL1c and SL2c. More preferably, using CSMA/CA protocol, the master unit M is configured to wirelessly transmit the update information to one of the slave bicycle electric components SL1 and SL2 while the one of the slave bicycle electric components is free of wireless communication with both of the master unit M and the other of the slave bicycle electric components SL1 and SL2. In other word, in this preferred configuration, before starting to wirelessly transmit the update information to a selected one of the slave bicycle electric components SL1 and SL2, the controller Mc is programmed to first determine if the master unit M is free of wireless communication with both the master unit M and the non-selected one of the slave bicycle electric components SL1 and SL2. Then, if it is determined that the master unit M is free of wireless communication with both the master unit M and the non-selected one of the slave bicycle electric components SL1 and SL2, the master two-way wireless communication unit Mc begins communicating with the selected one of the slave two-way wireless communication units SL1c and SL2c.

Figure 4:
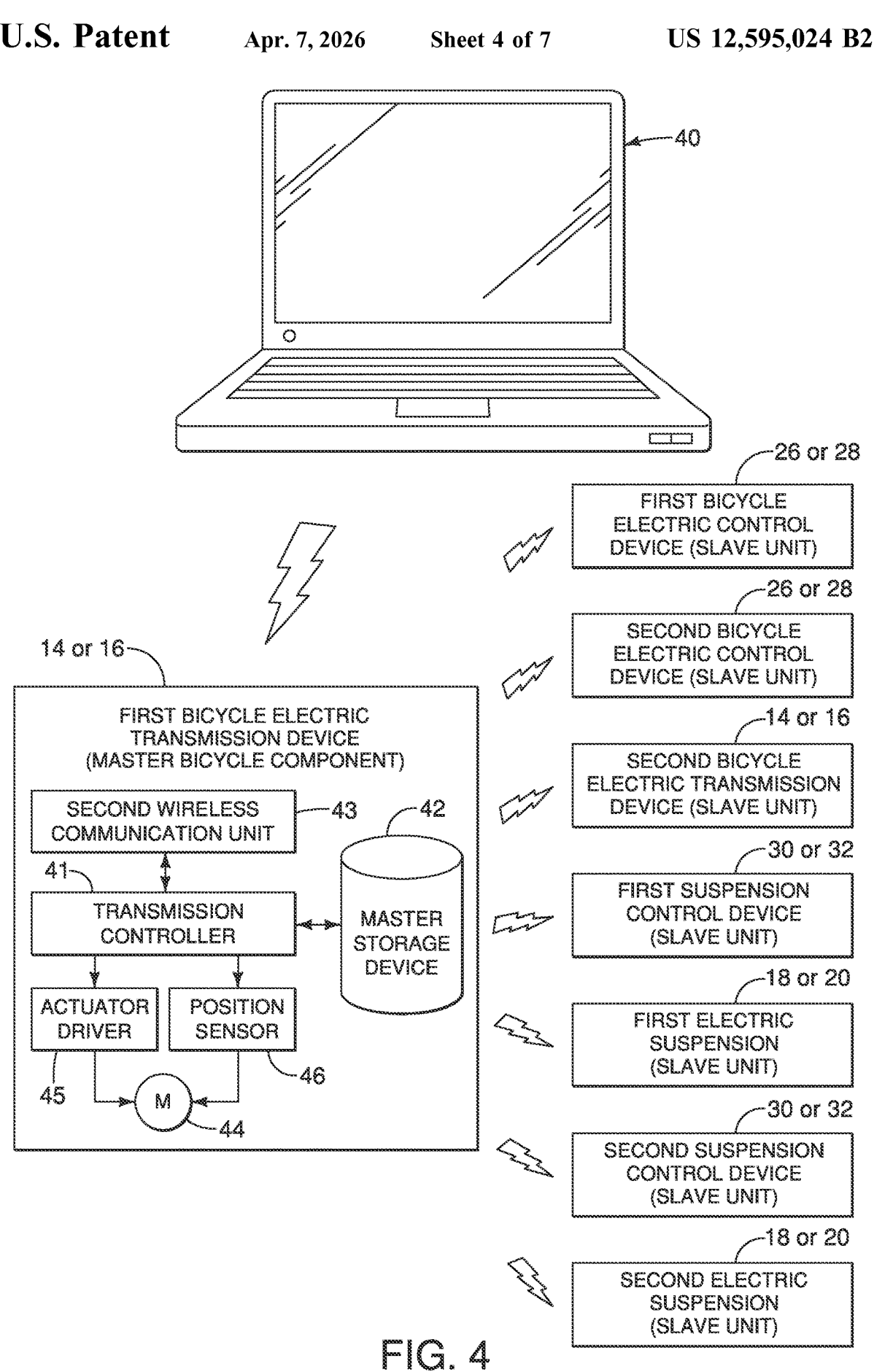
FIG. 4 is a schematic block diagram showing an exemplary configuration of the bicycle electric component setting system in which an external terminal device wirelessly transmits update information to a first bicycle electric transmission device as the master unit which in turn wirelessly transmits update information to seven slave bicycle electric components.

Referring to FIG. 4, an overview of the bicycle electric component setting system 12 will now be discussed in which a first bicycle electric transmission device (i.e., one of the front and rear derailleurs 14 and 16) is configured as master bicycle electric component for transmitting the update information to the other bicycle electric components 14 or 16, and 18, 20, 22, 26, 28, 30 and 32. In other words, in FIG. 4, the master bicycle electric component and the slave bicycle electric components at least include a bicycle electric transmission device (i.e., one of the front and rear derailleurs 14 and 16) and a bicycle electric control device (i.e., one of the bicycle electric control devices 26 and 28) that is configured to operate the bicycle electric transmission device. More specifically, in FIG. 4, the master bicycle electric component is the electrical transmission device and one of the slave bicycle electric components is the electric control device. Thus, the master bicycle electric component (i.e., one of the front and rear derailleurs 14 and 16) is configured to be mounted to a bicycle. The slave bicycle electric component (i.e., other one of the front and rear derailleurs 14 and 16, and the bicycle electric components 18, 20, 22, 26, 28, 30 and 32 is configured to receive the update information from the master bicycle electric component to change a setting of the slave bicycle electric component.

Here, in FIG. 4, the external terminal device 40 is illustrated as a laptop, but as mentioned above, could be anyone of a personal computer PC, a smart phone, or portable touch panel device (tablet device). The external terminal device 40 is the same as discussed above with respect to FIG. 3. The external terminal device 40 wirelessly communicates with the first bicycle electric transmission device 14 or 16 that is configured as a master bicycle electric component which is a specialized form of the master unit M of FIG. 3. In other words, the master bicycle electric component (i.e., one of the front and rear derailleurs 14 and 16) is configured to receive update information from the external terminal device 40.

The first bicycle electric transmission device 14 or 16 that is configured as the master bicycle electric component further comprises a transmission controller 41, a master storage device 42, a master two-way wireless communication unit 43, an electric motor or actuator 44, an actuator driver 45 and a position sensor 46. The transmission controller 41 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The master storage device 42 is configured to store update information, programs, settings, parameters, etc. that are used for the operation of the electric transmission device (e.g., the derailleur). The transmission controller 41 is programmed to process the wireless control signals from the wireless communication unit of the first bicycle control device 26 or 28, and then control the operation of the actuator 44 using the actuator driver 45 and the position sensor 46 in a conventional manner.

The transmission controller 41, the master storage device 42, the master two-way wireless communication unit 43 are configured and operate in the same manner as the master controller Ma, the master storage device Mb and the master two-way wireless communication unit Mc, as discussed above, for transmitting the update information to the two-way wireless communication unit of the other bicycle electric components 14 or 16, and 18, 20, 22, 26, 28, 30 and 32. Thus, for the sake of brevity, the descriptions of the transmission controller 41, the master storage device 42, and the master two-way wireless communication unit 43 will not be repeated herein.

Figure 5:
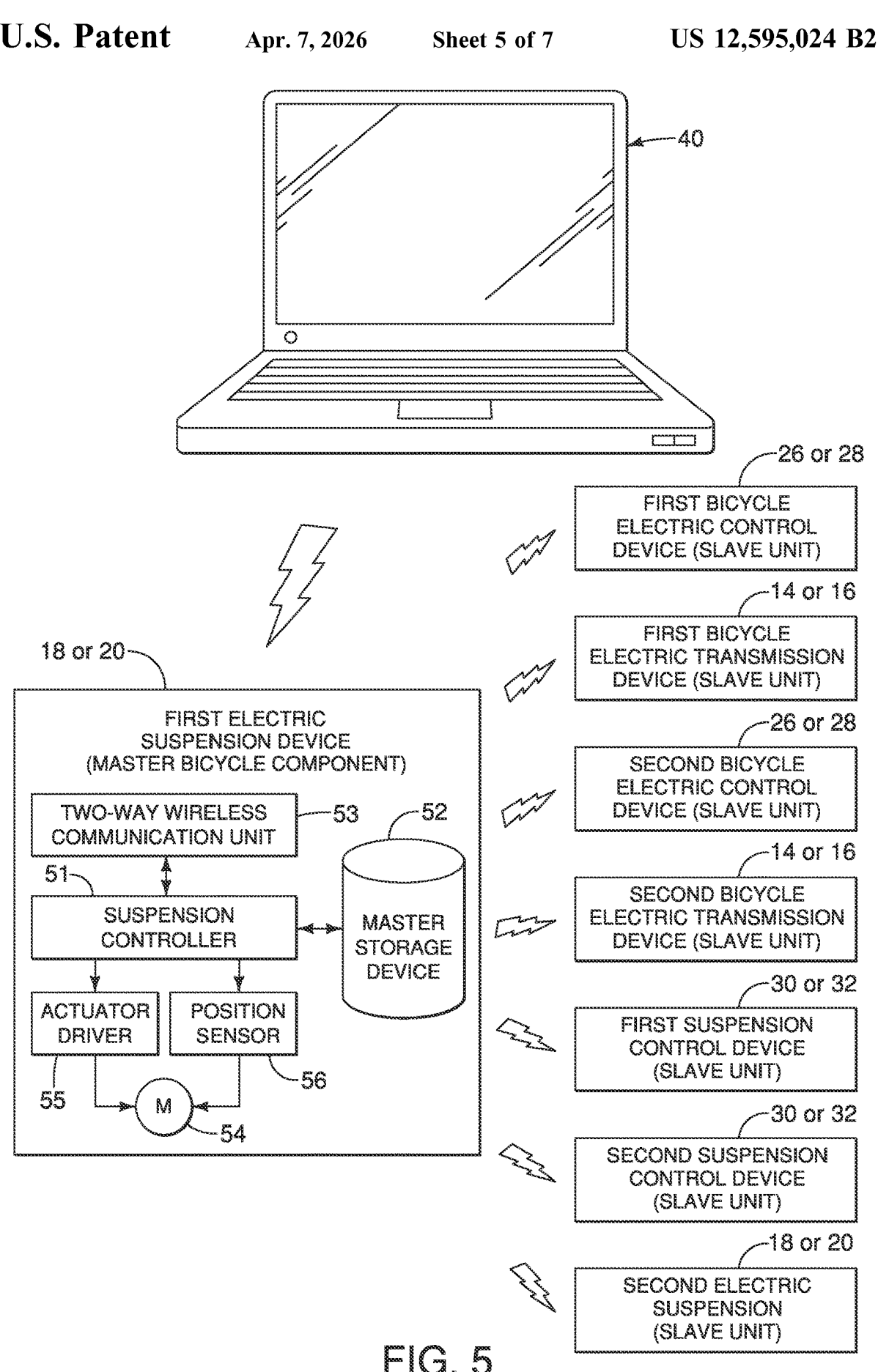
FIG. 5 is a schematic block diagram showing an exemplary configuration of the bicycle electric component setting system in which an external terminal device wirelessly transmits update information to a first bicycle electric suspension device as the master unit which in turn wirelessly transmits update information to seven slave bicycle electric components.

Referring to FIG. 5, an overview of the bicycle electric component setting system 12 will now be discussed in which a first bicycle electric transmission device (i.e., one of the front and rear electric suspensions 18 or 20) is configured as master bicycle electric component for transmitting the update information to the other bicycle electric components 14 or 16, and the bicycle electric components 18, 20, 22, 26, 28, 30 and 32. In other words, in FIG. 5, the master bicycle electric component and the slave bicycle electric components at least include a bicycle electric suspension (i.e., one of the front and rear electric suspensions 18 or 20) and a bicycle electric suspension control device (i.e., one of the bicycle electric control devices 30 and 32) that is configured to operate the bicycle electric suspension (i.e., one of the front and rear electric suspensions 18 or 20). More specifically, in FIG. 5, the master bicycle electric component is the bicycle electric suspension and one of the slave bicycle electric components is the suspension control device. Thus, the master bicycle electric component (i.e., one of the front and rear electric suspensions 18 or 20) is configured to be mounted to a bicycle. The slave bicycle electric component (i.e., other one of the front and rear electric suspension 18 or 20, and the bicycle electric components 18, 20, 22, 26, 28, 30 and 32 is configured to receive the update information from the master bicycle electric component to change a setting of the slave bicycle electric component.

Here, in FIG. 5, the external terminal device 40 is illustrated as a laptop, but as mentioned above, could be anyone of a personal computer PC, a smart phone, or portable touch panel device (tablet device). The external terminal device 40 is the same as discussed above with respect to FIG. 3. The external terminal device 40 wirelessly communicates with the first bicycle electric transmission device 14 or 16 that is configured as a master bicycle electric component which is a specialized form of the master unit M of FIG. 3.

The first bicycle electric transmission device 18 or 20 that is configured as the master bicycle electric component further comprises a suspension controller 51, a master storage device 52, a master two-way wireless communication unit 453, an electric motor or actuator 54, an actuator driver 55 and a position sensor 56. The transmission controller 51 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The master storage device 52 is configured to store update information, programs, settings, parameters, etc. that are used for the operation of the electric suspension device (e.g., the front and rear electric suspensions 18 or 20). The suspension controller 51 is programmed to process the wireless control signals from the wireless communication unit of the first suspension control device 30 or 32, and then control the operation of the actuator 54 using the actuator driver 55 and the position sensor 56 in a conventional manner.

The transmission controller 51, the master storage device 52, the master two-way wireless communication unit 53 are configured and operate in the same manner as the master controller Ma, the master storage device Mb and the master two-way wireless communication unit Mc, as discussed above, for transmitting the update information to the two-way wireless communication unit of the other bicycle electric components 18 or 20, and the bicycle electric components 14, 26, 22, 26, 28, 30 and 32. Thus, for the sake of brevity, the descriptions of the transmission controller 51, the master storage device 52, the master two-way wireless communication unit 53 will not be repeated herein.

Figure 6:
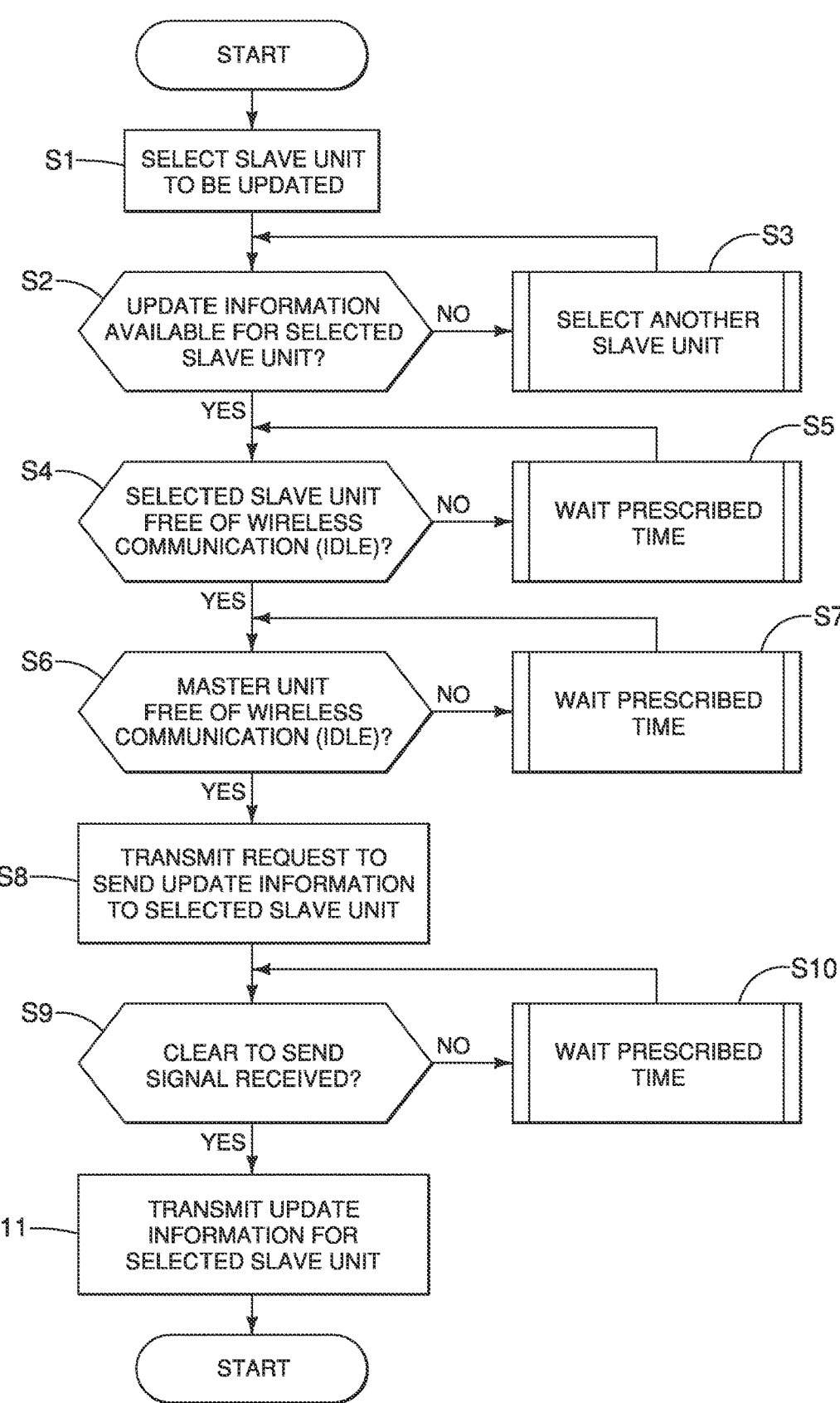
FIG. 6 is a flow chart illustrating a control process executed by the controller of the master unit to wirelessly transmit update information to the seven slave bicycle electric components.

Referring to FIG. 6, a control process is illustrated that is executed by the master controllers of the master units to wirelessly transmit update information to the slave bicycle electric components. The control process of FIG. 6 is executed by the master controller after the receiving the update information from the external terminal device 40.

In step S1, the master controller selects one of the slave units (i.e., slave bicycle electric components) to be updated, the control process then proceeds to step S2.

In step S2, the master controller determines if update information is available for the selected slave unit. If there is no update information available for the selected slave unit, then the control process proceeds to step S3.

In step S3, the master controller selects another of the slave units to be updated, and then the control process proceeds to back step S2. However, if update information is available for the selected slave unit in step S2, then the control process proceeds to step S4.

In step S4, the master controller determines if the selected slave unit is free of wireless communication with any other slave unit or the master unit. If the master controller determines the selected slave unit is communicating another slave unit or the master unit, then the control process proceeds to step S5.

In step S5, the master controller waits a prescribed time in order to allow the communication between the selected slave unit and the other slave unit or the master unit to stop. Then the control process proceeds to back to step S4 to determine if the selected slave unit is still communicating with the other slave unit or the master unit. If the selected slave unit is not communicating with the other slave unit or the master unit, then the control process proceeds to step S6.

In step S6, the master controller determines if the master unit is free of wireless communication with any of the slave units. If the master controller determines the master unit is communicating one of the slave units, then the control process proceeds to step S7.

In step S7, the master controller waits a prescribed time in order to allow the communication between the master unit and one of the slave units to stop. Then the control process proceeds to back to step S6 to determine if the master unit is still communicating with one of the slave units. If the master unit is not communicating with any of the slave units, then the control process proceeds to step S8.

In step S8, the master controller transmits a request to send the update information to the selected slave unit. Then the control process proceeds to step S9.

In step S9, the master controller determines if the selected slave unit ready (i.e., communication has been established between the master unit and the selected slave unit) to receive the update information from the master unit. If the master controller determines it is clear not to send the update information to the selected slave unit, then the control process proceeds to step S10.

In step S10, the master controller waits a prescribed time in order to allow the communication between the master unit and the selected slave unit to be established. Then the control process proceeds to back to step S9. If the master unit and the selected slave unit have established communication, then the control process proceeds to step S11.

In step S11, the master controller transmits the update information to the selected slave unit.

Figure 7:
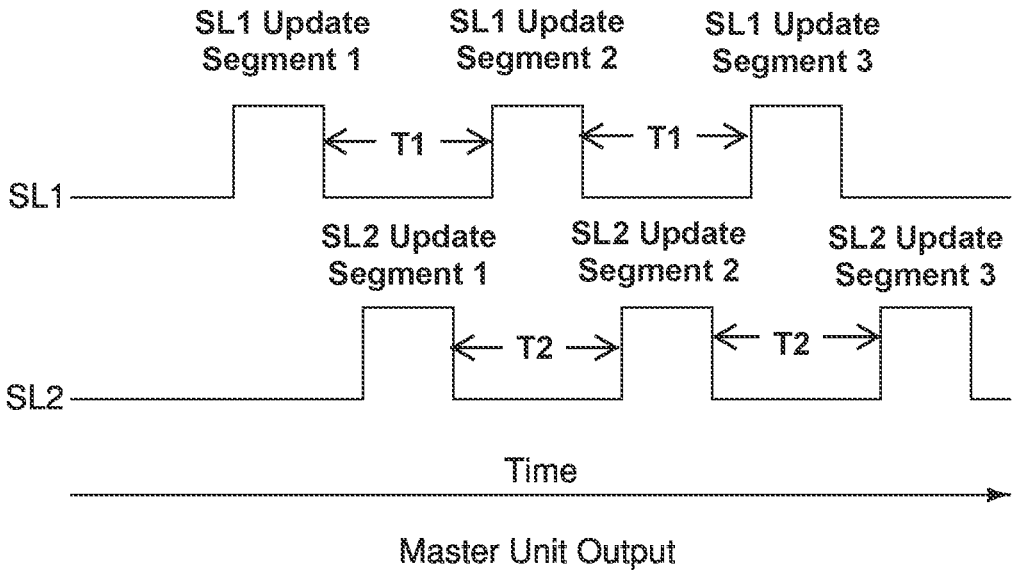
FIG. 7 is a signal timing diagram illustrating a master bicycle electrical component (master unit) output for updating two slave bicycle electrical components (slave units) by wirelessly transmitting the update information to one of the slave bicycle electrical components while the other of the slave bicycle electrical components is free of wireless communication with the master bicycle electrical component.
Figure 8:
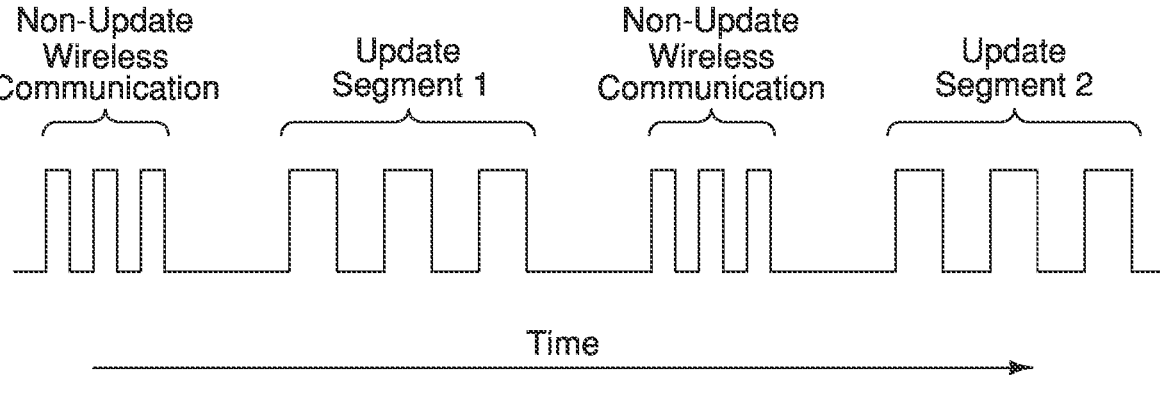
FIG. 8 is a signal timing diagram illustrating a master bicycle electrical component (master unit) output for updating a selected slave bicycle electrical component (slave unit) by wirelessly transmitting the update information to the selected slave bicycle electrical component during a period in which the selected slave bicycle electrical components is free of wireless communication with both the master bicycle electrical component and any of the other slave bicycle electrical components.

Referring to FIGS. 7 and 8, the master controller of the master unit is preferably programmed to split the update information into prescribed segments upon determining the update information is larger than a prescribed amount. Thus, when the update information is a large amount of data, the master controller of the master unit is programmed to transmit the update information is prescribed segments. When the update information is equal to or less than the prescribed amount, the master controller of the master unit is preferably programmed to transmit the update information as a single batch file. To expedite the transmission of the update information to the slave units, the master controller of the master unit can be programmed as shown in FIG. 7 to update two slave units at the same time. In particular, the update information for the first slave bicycle electrical component SL1 is split into a plurality of prescribed segments that are transmitted at prescribed intervals with predetermined non-transmitting periods T1 therebetween. During the predetermined non-transmitting periods T1, the master controller of the master unit transmits prescribed segments of the update information for the second slave bicycle electrical component SL2. In this way, the master controller of the master unit updates two slave bicycle electrical components (slave units) by wirelessly transmitting the update information to one of the slave bicycle electrical components while the other of the slave bicycle electrical components is free of wireless communication with the master bicycle electrical component.

In FIG. 8, when the master controller of the master unit is transmitting the update information the selected slave bicycle electrical component in prescribed segments, the master controller of the master unit will wait until the selected slave bicycle electrical component is free of wireless communication before transmitting the next prescribed segment of the update information. Thus, FIG. 8 shows the update information being wirelessly transmitted to the master unit component (master unit) during a period in which the selected slave bicycle electrical components is free of wireless communication with both the master unit and any of the other slave units.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A master electric component for communicating with at least two slave bicycle electric components, the at least two bicycle electric components including a first slave bicycle electric component and a second slave bicycle electric component, each of the at least two slave bicycle electric mounting components having a bicycle mounting part that is configured to be mounted to a bicycle, the master electric component comprising:

a master two-way wireless communication unit configured to wirelessly receive update information from an external terminal device that is not mounted to the bicycle, the update information being information for updating at least one of software and firmware of the at least two slave bicycle electric components, the master electric component being configured to wirelessly transmit the update information directly to the first slave bicycle electric component in a case where the update information is for the first slave bicycle electric component, the master electric component being configured not to transmit the update information to the second slave bicycle electric component in a case where the update information is not for the second slave bicycle electric component, and the master electric component being configured not to transmit the update information to the first slave bicycle electric component in a case where the update information is for the second slave bicycle electric component.

2. The master electric component according to claim 1, further comprising a master storage device that stores the update information.

3. The master electric component according to claim 1, wherein the update information includes software update, firmware update, and component settings.

4. A master bicycle electric component comprising:

a bicycle mounting part configured to mount the master bicycle electric component to a bicycle;

an actuator; and a master two-way wireless communication unit configured to wirelessly receive update information from an external terminal device that is not mounted to the bicycle and being separate and remote from the master bicycle electric component, the actuator being movably controlled in response to wireless control signals received from the master two-way wireless communication unit, in a case where the update information includes information for updating at least one of software and firmware of at least one slave bicycle electric component, the master electric component being configured to wirelessly transmit the update information to the at least one slave bicycle electric component directly, the master electric component being configured not to transmit the update information to the second slave bicycle electric component in a case where the update information is not for the second slave bicycle electric component, and the master electric component being configured not to transmit the update information to the first slave bicycle electric component in a case where the update information is for the second slave bicycle electric component.

5. The master bicycle electric component according to claim 4, wherein the master bicycle electric component is included in a bicycle electric transmission device.

6. The master bicycle electric component according to claim 5, wherein the bicycle electric transmission device includes an electrically operated front derailleur and an electrically operated rear derailleur, and the master bicycle electric component is one of the electrically operated front derailleur and the electrically operated rear derailleur.

7. A bicycle electric component setting system comprising:

the master electric component according to claim 1, and the external terminal device including a two-way wireless communication unit configured to wirelessly communicate the update information.

8. The bicycle electric component setting system according to claim 7, wherein the external terminal device includes a terminal storage device that stores the update information.

9. The bicycle electric component setting system according to claim 8, wherein the external terminal device includes a terminal controller configured to execute a program that allows a user to program settings of a slave bicycle electric component, the slave bicycle electric component includes at least one of a bicycle electric transmission device, a bicycle electric suspension device, an electric adjustable seatpost, a bicycle electric control device to control the bicycle electric transmission device, and a bicycle electric suspension control device.

10. The master electric component according to claim 1, wherein each of the at least two slave bicycle electric components is one of a bicycle electric transmission device, a bicycle electric suspension device, an electric adjustable seatpost, a bicycle electric control device to control the bicycle electric transmission device, and a bicycle electric suspension control device.

11. The master electric component according to claim 1, wherein the external terminal device is configured to wirelessly transmit the update information based on a user preference.

12. A bicycle electric component setting system comprising:

the master electric component according to claim 1;

the at least two slave bicycle electric components recited in claim 1; and the external terminal device recited in claim 1, the external terminal device being configured to wirelessly transmit the update information based on a user preference.

13. A master electric component for communicating with at least two slave bicycle electric components, the at least two bicycle electric components including a first slave bicycle electric component and a second slave bicycle electric component, each of the at least two slave bicycle electric mounting components having a bicycle mounting part that is configured to be mounted to a bicycle, the master electric component comprising:

a master two-way wireless communication unit configured to wirelessly receive update information from an external terminal device that is not mounted to the bicycle, the update information being information for updating at least one of software and firmware of the at least two slave bicycle electric components, the master electric component being configured to wirelessly transmit the update information directly to the at least two bicycle components, the first slave bicycle electric component being configured to update the at least one of software and firmware of the first slave bicycle electric component in a case where the update information is for the first slave bicycle electric component, the master electric component being configured not to transmit the update information to the second slave bicycle electric component in a case where the update information is not for the second slave bicycle electric component, and the master electric component being configured not to transmit the update information to the first slave bicycle electric component in a case where the update information is for the second slave bicycle electric component.

<div align="center">* * * * *</div>